(12) United States Patent
Sauermann

(10) Patent No.: US 7,918,958 B2
(45) Date of Patent: Apr. 5, 2011

(54) METHOD FOR PRODUCING A RELEASABLE SEAL WITH A SEALING COMPOUND AND USE OF ADHESIVE STRIPS FOR CARRYING OUT THE METHOD

(75) Inventor: Axel Sauermann, Deinste-Helmate (DE)

(73) Assignee: Airbus Operations GmbH, Hamburg (DE)

( * ) Notice: Subject to any disclaimer, the term of this patent is extended or adjusted under 35 U.S.C. 154(b) by 171 days.

(21) Appl. No.: 12/085,626

(22) PCT Filed: Dec. 21, 2006

(86) PCT No.: PCT/EP2006/070084
§ 371 (c)(1),
(2), (4) Date: Jul. 28, 2008

(87) PCT Pub. No.: WO2007/071762
PCT Pub. Date: Jun. 28, 2007

(65) Prior Publication Data
US 2009/0014117 A1    Jan. 15, 2009

(30) Foreign Application Priority Data
Dec. 23, 2005 (DE) .......................... 10 2005 062 190

(51) Int. Cl.
*B29C 65/50* (2006.01)
(52) U.S. Cl. ........................................ 156/247; 156/249

(58) Field of Classification Search ................. 156/247, 156/289
See application file for complete search history.

(56) References Cited

U.S. PATENT DOCUMENTS
5,827,598 A * 10/1998 Larsen et al. ................. 428/131

FOREIGN PATENT DOCUMENTS
FR    1 572 639    7/1969
JP    2000-303652   10/2000

OTHER PUBLICATIONS
3M, Technical Data Sheet for Circuit Plating Tape 1280, 2001.*

* cited by examiner

*Primary Examiner* — Khanh Nguyen
*Assistant Examiner* — Margaret Squalls
(74) *Attorney, Agent, or Firm* — Greer, Burns & Crain, Ltd.

(57) ABSTRACT

Disclosed is a method for producing a releasable seal with a sealing compound between two fairing parts, in particular between two fairing parts for the wing-fuselage fillet of aircraft, including the steps of applying adhesive strips to respectively opposite edges, of the fairing parts and outer surfaces adjacent to them of the fairing parts; filling a sealing joint extending between the opposite edges with the sealing compound; and removing the adhesive strips after the curing of the sealing compound. This makes it possible to provide a re-releasable seal with a sealing compound which is curable or cures on its own in air between two fairing parts without the use of release agents. Also disclosed is the use of adhesive strips for carrying out this method.

10 Claims, 1 Drawing Sheet

METHOD FOR PRODUCING A RELEASABLE SEAL WITH A SEALING COMPOUND AND USE OF ADHESIVE STRIPS FOR CARRYING OUT THE METHOD

FIELD OF THE INVENTION

The invention relates to a method for producing a releasable seal with a sealing compound between two fairing parts, in particular between two fairing parts for the wing-fuselage fillet of air-craft.

Furthermore, the invention relates to the use of adhesive strips for carrying out the method.

BACKGROUND OF THE INVENTION

Previously, gaps between fairing parts, in particular for the wing-fuselage fillet of aircraft, have been sealed by hard rubber seals, in order that the fairing parts can be removed again later for servicing purposes. In future, curable sealing compounds will also be used for sealing the gap between the fairing parts. In this case, however, it is necessary to use release agents, such as for example a release coating or the like, in order to ensure that the curable sealing compound does not stick to the fairing parts. The release agent is applied to the fairing parts in the regions in which the sealing compound is to be applied. When doing so, it must be ensured that the release agent does not get onto adjacent surfaces of the fairing parts, since any remains of release agent make it impossible to carry out subsequent processing steps, such as for example coating work or the like, and must therefore be removed by laborious cleaning methods.

SUMMARY OF THE INVENTION

One object of the invention is to provide a method by which it is possible for gaps or sealing joints between fairing parts, in particular between fairing parts for the wing-fuselage fillet of aircraft, to be provided with a seal that can be released again if need be by using a curable sealing compound but dispensing with release agents.

This is achieved by a method for producing a releasable seal with a sealing compound between two fairing parts, in particular between fairing parts for the wing-fuselage fillet of aircraft, comprising the following steps:

applying adhesive strips to respectively opposite edges of the fairing parts and outer surfaces adjacent to them of the fairing parts, filling a sealing joint extending between the opposite edges with the sealing compound and removing the adhesive strips after the curing of the sealing compound.

Since the adhesive strips are applied to respectively opposite edges of the fairing parts and the outer surfaces adjacent to them of the fairing parts, the seal formed in this way between the fairing parts by introducing a curable sealing compound into the sealing joint can easily be released again if required, for example in the course of servicing and inspection work, after the curing of the sealing compound and the preferably complete removal of the adhesive strips.

The above method makes it possible to provide a releasable seal between the fairing parts by using a curable sealing compound without the use of release agents, essentially the same effect as a conventional flexible rubber seal being achieved as a result between the fairing parts.

One embodiment of the method provides that the adhesive strips are firstly applied along the edges of the fairing parts and subsequently placed onto the outer surfaces of the fairing parts. This ensures that the edges of the fairing parts are covered essentially completely by the adhesive strips irrespective of the material thickness of the fairing parts in the region of the gap to be sealed.

As specified by a further embodiment, it is provided that the adhesive strips are respectively applied to the outer surfaces of the fairing parts on both sides in the region of the sealing joint in a width that corresponds to at least twice a material thickness of the fairing parts. This largely prevents contamination of the outer surfaces of the fairing parts with the sealing compound, which has generally necessitated extensive reworking operations to be undertaken, for example to allow subsequent coating and/or priming work.

A further embodiment of the method provides that, after the curing of the sealing compound, the adhesive strips are pulled out essentially at right angles with respect to the outer surfaces of the fairing parts in order to achieve complete removal of the adhesive strips. This makes it possible for the adhesive strips to be removed easily, and in particular also completely.

Furthermore, an object according to the invention is achieved by the use of adhesive strips for carrying out the above-described method, wherein upper sides of the adhesive strips have anti-adhesive properties, in order largely to avoid the sealing compound sticking to the upper sides of the adhesive strips.

The fact that upper sides of the adhesive strips that are used have anti-adhesive properties, in order largely to avoid the sealing compound sticking to the upper sides of the adhesive strips, makes it possible for the adhesive strips to be detached easily and largely without leaving any remains from the sealing compound that has been introduced into the gap between the fairing parts and cured. The adhesive strips may be formed for example by self-adhesive Teflon or polyethylene strips or the like.

One embodiment of the adhesive strips that are used provides that the adhesive strips have a low flexibility. As a result of the intrinsic stiffness of the adhesive strips that are used, the pulling out of the adhesive strip from the sealing joint is facilitated.

A further embodiment provides that the adhesive strips that are used have a low material thickness, in particular below 0.5 mm, whereby better adaptation to the contours of the edges of the fairing parts is made possible.

As specified by a further embodiment, it is provided that the adhesive strips that are used have a width of up to 50 mm, in particular a width of up to 25 mm, so that adequate coverage of the outer surface of the fairing parts that is to be protected from being contaminated with the sealing compound is ensured.

Further advantageous refinements of the arrangement are presented in the further patent claims.

DETAILED DESCRIPTION OF THE INVENTION

Figure 1:
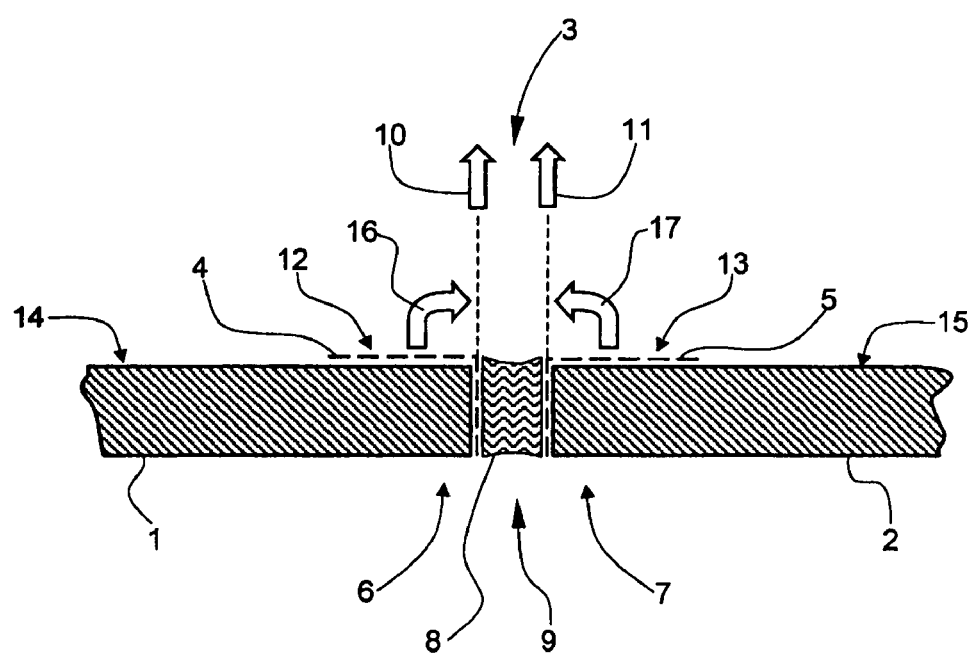
FIG. 1 shows a schematic cross-sectional representation of a sealing joint between two fairing parts that is formed by the method according to the invention.

FIG. 1 shows a schematic cross-sectional representation of a sealing joint between two fairing parts, in particular between fairing parts for the wing-fuselage fillet of aircraft, that is formed by the method according to the invention.

A first fairing part 1 is releasably connected to a second fairing part 2 by means of a seal 3. To produce the seal 3 by means of the method according to the invention, firstly the adhesive strips 4, 5 are placed on or adhesively attached to the edges 6, 7 of the opposite fairing parts 1, 2, as shown in the representation of FIG. 1.

Subsequently, a curable sealing compound 8 is introduced into the sealing joint 9 extending between the edges 6, 7. The not yet completely cured sealing compound 8 does not generally run through, in particular if the sealing compound is of a low viscosity, since underneath the fairing parts 1, 2 there is generally a substructure, not represented, to which the fairing parts are bolted. If appropriate, an additional support may be arranged underneath the sealing joint 9 to prevent the not yet cured sealing compound 8 from running through.

After the preferably complete curing of the sealing compound 8, the adhesive strips 4, 5 may be pulled out from the sealing joint 9, as symbolized by the directional arrows 10, 11, at essentially right angles with respect to the fairing parts 1, 2.

As a result of the anti-adhesive properties of the upper sides 12, 13 of the adhesive strips, the adhesive strips 4, 5 can be removed from the sealing joint 9 largely without leaving any remains. This makes it possible for the method according to the invention to provide a releasable seal 3 between two fairing parts by using a curable sealing compound without the use of release agents.

The adhesive strips 4, 5 that can be used have a material thickness of less than 0.5 mm, with a width of for example approximately 25 mm. As a result, adequate coverage of the outer surfaces 14, 15 or the upper sides of the fairing parts 1, 2, is ensured, and consequently contamination of the outer surfaces 14, 15 with the sealing compound 8 is avoided. Alternatively, wider adhesive strips up to a width of about 50 mm may also be used, in order to achieve better coverage, in particular in the case of greater material thicknesses of the fairing parts 1, 2.

A material thickness of the adhesive strips 4, 5 of less than 1 mm on the one hand ensures adequate flexibility of the adhesive strips 4, 5 to follow the contours of the geometry of the fairing parts 1, 2 and at the same time ensures good contact of the adhesive strips 4, 5. On the other hand, it is necessary that the adhesive strips 4, 5 only have a low flexibility, that is to say in particular have an adequate intrinsic stiffness, in particular are not able to be "draped", in order to make it possible for them to be pulled out from the sealing joint 9 without leaving any remains. Therefore, fabric-reinforced adhesive strips are generally unsuitable for carrying out the method.

Furthermore, it is necessary that the upper sides 12, 13 of the adhesive strips 4, 5 have good anti-adhesive properties, in order to avoid sticking of the sealing compound 8. It is preferred for the upper sides 12, 13 of the adhesive strips 4, 5 to be formed such that they are as smooth as possible. For this purpose, the adhesive strips may for example have on the surface facing away from the self-adhesive side a Teflon or polyethylene coating or a comparable anti-adhesive coating. Alternatively, the adhesive strips may also be formed directly as self-adhesive polyethylene or Teflon strips.

To detach the adhesive strips 4, 5, they are firstly pulled off in the direction of the directional arrows 16, 17 from the outer surfaces 14, 15 of the fairing parts 1, 2 and bent up to the extent that an angle of approximately 90° is obtained between the adhesive strips 4, 5 and the outer surfaces 14, 15 of the fairing parts 1, 2. Subsequently, the adhesive strips 4, 5 are pulled out from the sealing joint 9 in the direction of the directional arrows 10, 11. This procedure makes it possible for the adhesive strips 4, 5 to be pulled out from the sealing joint 9 completely, without leaving any remains.

Given a material thickness of the fairing parts 1, 2 of approximately 3 mm, the width of the sealing joint 9 is for example approximately 12 mm.

To carry out the method according to the invention, the known types of adhesive strip ABS® 5093 AT25 and Scotch® 3M 1280 may be used for example.

The known curable or curing sealing compounds MC 650 B1 and MC 780 B1/2 have proven to be particularly suitable for carrying out the method according to the invention for forming a releasable seal with a sealing compound between two fairing parts. These sealing compounds cure by adding a curing agent or on their own in air (at 23° C.±2° C.).

What is claimed is:

1. A method for producing a releasable seal with a sealing compound between two fairing parts, the method comprising the steps of:
   applying adhesive strips to respectively opposite facing edges of the fairing parts and outer surfaces adjacent to the opposite facing edges of the fairing parts,
   filling a sealing joint extending between the opposite edges with the sealing compound and
   removing the adhesive strips after the curing of the sealing compound, wherein the adhesive strips are pulled out from the sealing joint generally at right angles with respect to the outer surfaces of the fairing parts.

2. The method according to claim 1, wherein the adhesive strips are firstly applied along the edges of the fairing parts and subsequently placed onto the outer surfaces of the fairing parts.

3. The method according to claim 1, wherein the adhesive strips are respectively applied to the outer surfaces of the fairing parts on both sides in the region of the sealing joint in a width that corresponds to at least twice a material thickness of the fairing parts.

4. The method according to claim 1, wherein the two fairing parts are fairing parts for the wing-fuselage fillet of aircraft.

5. The method according to claim 1, wherein upper sides of the adhesive strips have anti-adhesive properties, in order largely to avoid the sealing compound sticking to the upper sides of the adhesive strips.

6. The method according to claim 1, wherein the adhesive strips have a relatively low flexibility that permits bending while providing sufficient intrinsic stiffness so as to prevent the strips from being draped, said sufficient intrinsic stiffness facilitating pulling removal of said strips from said sealing joint without leaving any non-adhesive remnants of said strips.

7. The method according to claim 1, wherein the adhesive strips have a low material thickness.

8. The method according to claim 7, wherein the adhesive strips have a material thickness that is less than about 0.5 mm.

9. The method according to claim 1, wherein the adhesive strips have a width of up to about 50 mm.

10. The method according to claim 1, wherein the adhesive strips have a width of up to about 25 mm.

* * * * *